(No Model.) 4 Sheets—Sheet 1.
C. ANDERSON.
SULKY PLOW.
No. 499,868. Patented June 20, 1893.
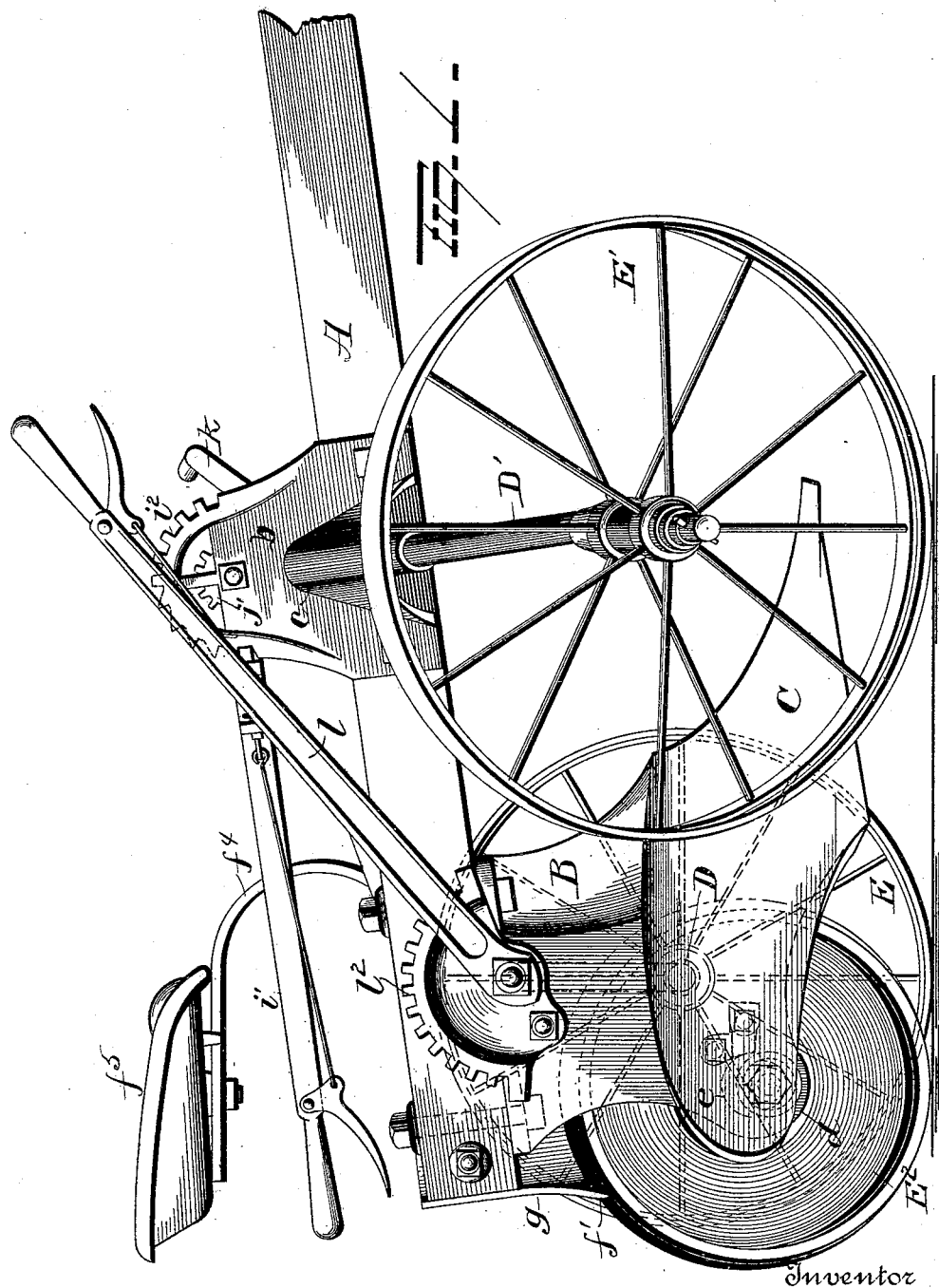
Witnesses
E. L. Nottingham
G. F. Downing
Inventor
Charles Anderson
By H. A. Suymom.
Attorney

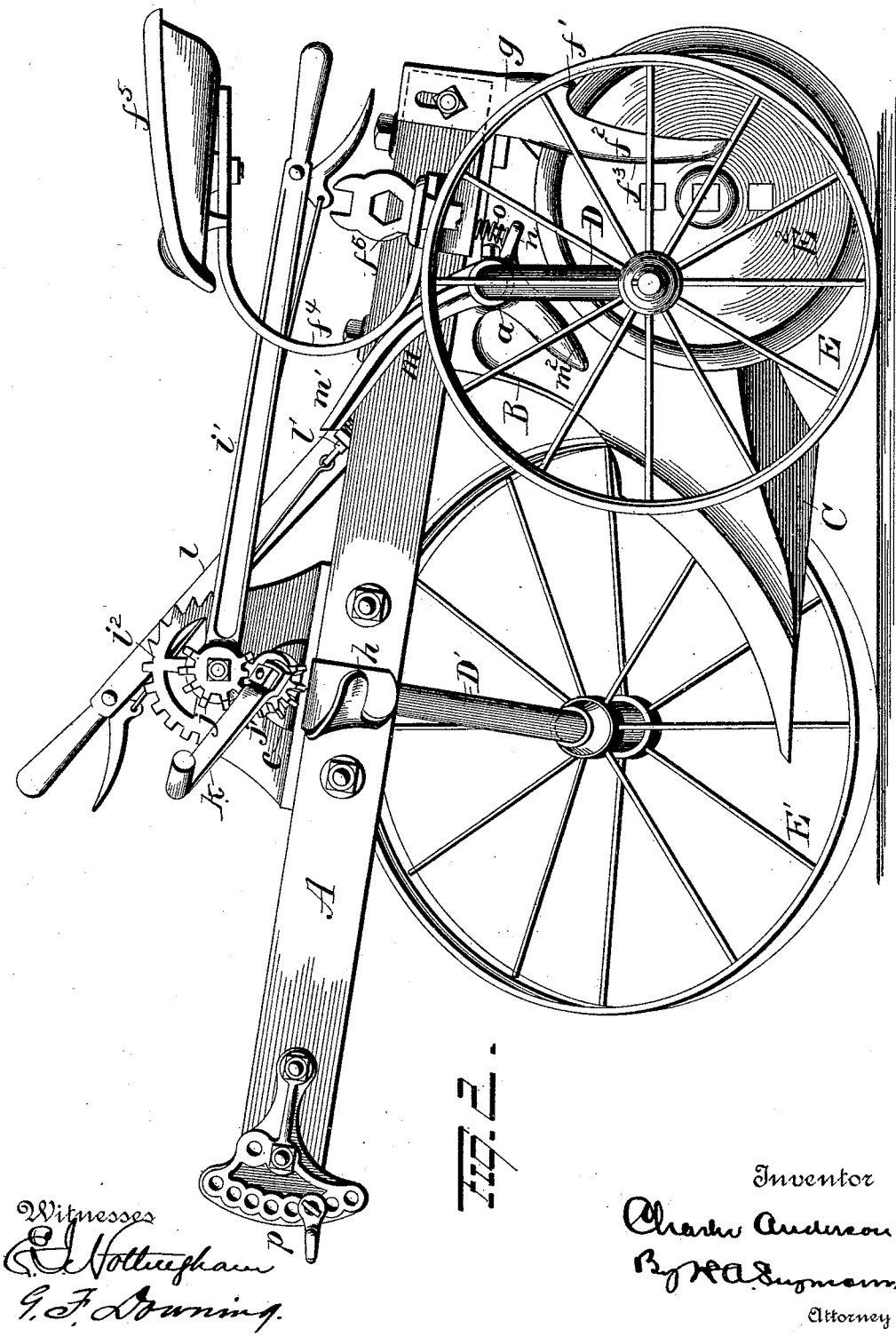

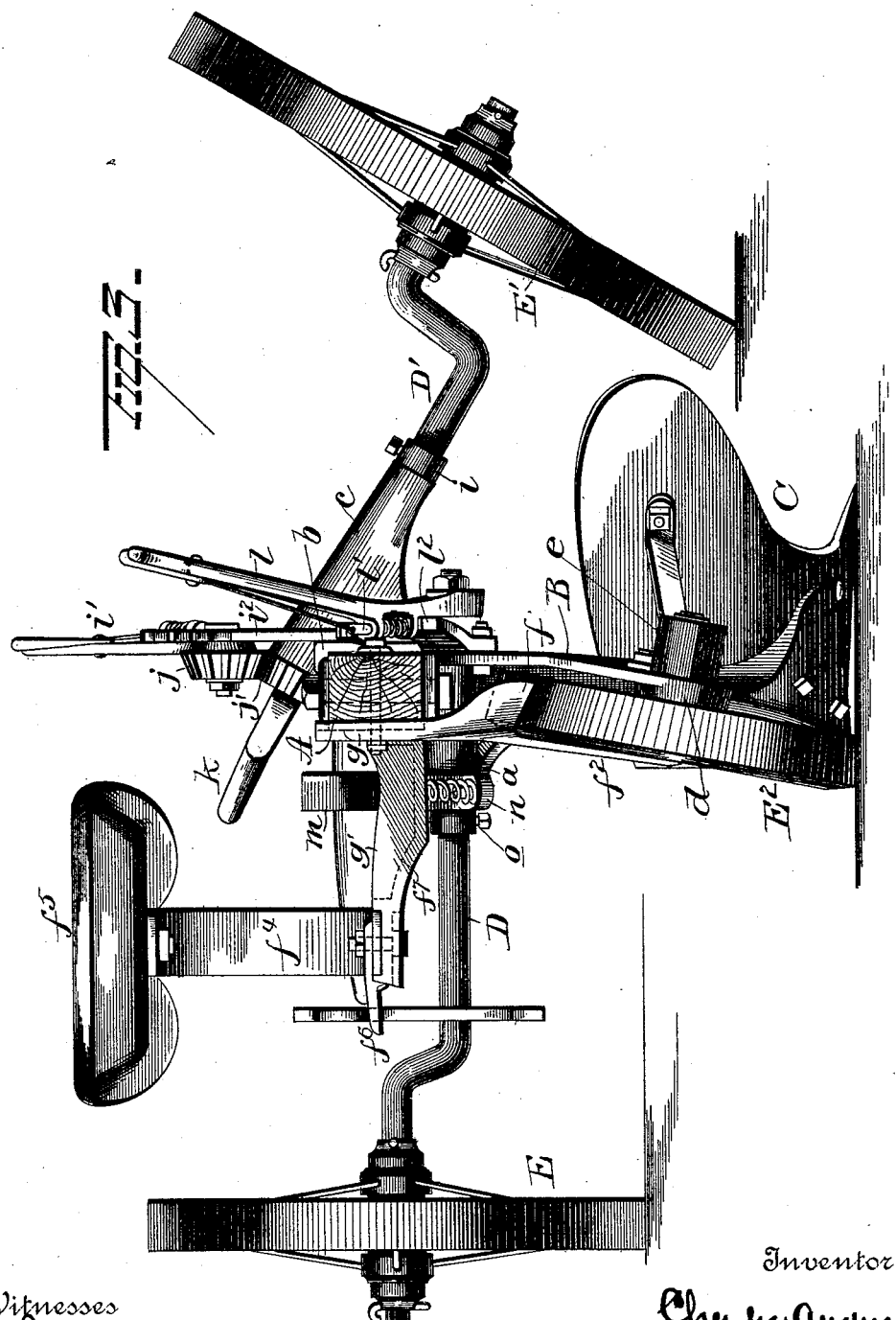

(No Model.) 4 Sheets—Sheet 4.
C. ANDERSON.
SULKY PLOW.
No. 499,868. Patented June 20, 1893.
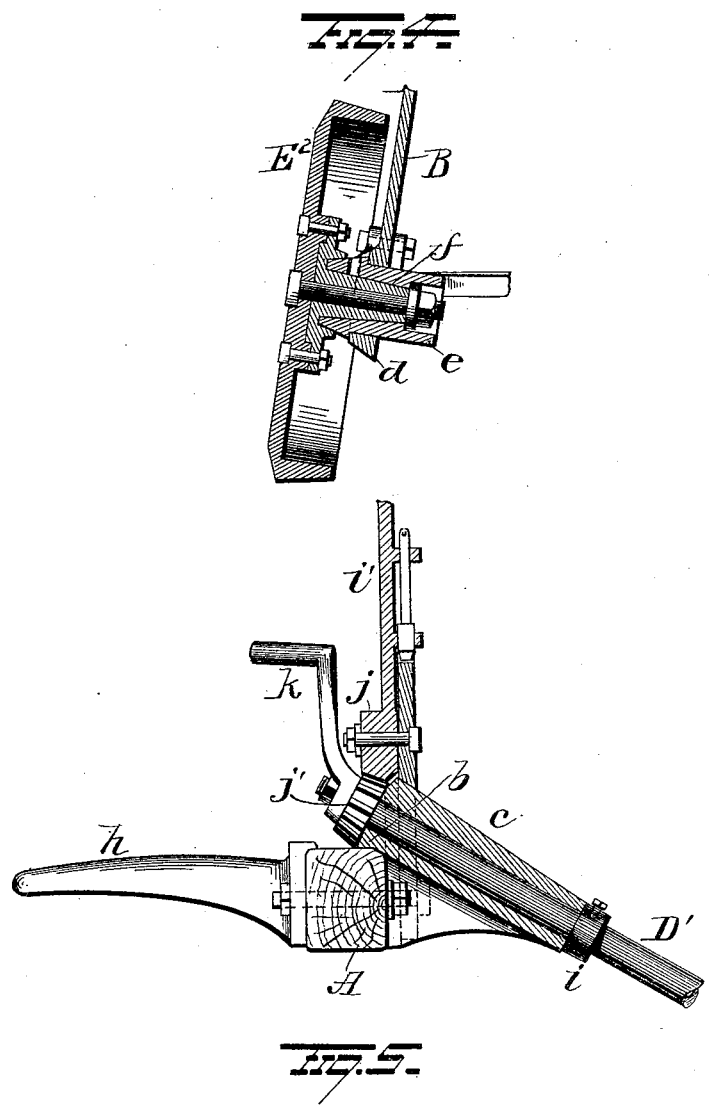
Witnesses
Inventor
Charles Anderson
Attorney

UNITED STATES PATENT OFFICE.

CHARLES ANDERSON, OF SOUTH BEND, INDIANA, ASSIGNOR TO THE SOUTH BEND IRON WORKS, OF SAME PLACE.

SULKY-PLOW.

SPECIFICATION forming part of Letters Patent No. 499,868, dated June 20, 1893.

Application filed December 20, 1892. Serial No. 455,747. (No model.)

*To all whom it may concern:*

Be it known that I, CHARLES ANDERSON, residing at South Bend, in the county of St. Joseph and State of Indiana, have invented certain new and useful Improvements in Sulky-Plows; and I do hereby declare the following to be a full, clear, and exact description of the invention, such as will enable others skilled in the art to which it appertains to make and use the same.

My invention relates to an improvement in wheeled plows,—its object being to produce a simple, practical and easy working wheeled plow.

A further object is to produce simple and efficient means whereby the plowman will be enabled to raise and lower the plow with the expenditure of a small amount of exertion.

A further object is to attach the small furrow wheel to the plow in such manner as to prevent side draft and permit square corners to be turned without raising the plow and at the same time to have the turn of the corners perfect and the plowing at same equal to the regular furrows.

A further object is to arrange the wheels of the plow in such manner that the small furrow wheel will act as a pivot when the plow is turned and so that the land wheel will act as a guide to same and make the turn perfect. A further object is to provide an improved brake for the plow, so as to prevent the same from running on the heels of the team in going down hill.

A further object is to produce a wheeled plow having a small number of parts and which shall be effectual in the performance of its functions.

With these objects in view the invention consists in certain novel features of construction and combinations and arrangements of parts as hereinafter set forth and pointed out in the claims.

In the accompanying drawings: Figure 1 is a view from the mold-board side of the plow. Fig. 2 is a similar view from the land-side side of the plow. Fig. 3 is an end view. Figs. 4 and 5 are detail views.

A represents a plow beam, to the rear end of which a standard B is secured and to said standard the plow C is secured. Projecting laterally from the top of the standard B is a sleeve $a$. A crank axle D passes loosely through the sleeve $a$ and through the standard,—said crank axle D having a land wheel E mounted thereon.

Secured to the mold-board side of the beam A at a point between its ends, preferably at or slightly in advance of the center thereof, a bracket $b$ is secured, from which an inclined sleeve $c$ projects laterally and downwardly. This inclined sleeve and bracket afford an extended inclined bearing for a crank axle D' which passes loosely through them, said crank axle having a furrow wheel E' mounted thereon, said wheel being adapted to regulate the depth and width of the furrow slice, as will hereinafter appear. The rear edge of the standard B is made with an enlargement $d$, to which a laterally projecting sleeve $e$ is secured, said sleeve being adapted for the reception of the journal $f$ of a small furrow wheel $E^2$, and affording an extended bearing therefor, said bearing being preferably slightly inclined.

In order to effectually remove dirt adhering to the periphery and face of the small furrow wheel $E^2$, a scraper $g$ is adjustably secured to the rear end of the beam A. This scraper is made with an edged shoulder $f'$ adapted to scrape the periphery of the said furrow wheel and a downwardly extending integral arm $f^2$ having a comparatively sharp edge $f^3$ adapted to remove dirt adhering to the face of said furrow wheel. A bracket $f^7$ is secured to and projects laterally from the rear end of the beam A, and at its free end supports a bracket $f^4$ to which the seat $f^5$ is secured. A small loop or arm $f^6$ projects from the end of the bracket and is adapted for the reception of a wrench. The bracket may be made with a receptacle $g'$ for the reception of small tools or other devices which may be required during the operation of the plow. A foot rest $h$ is preferably secured to the beam A at a proper point for the accommodation of the feet of the plowman.

The crank axle D' which carries the forward furrow wheel E' is provided with a collar $i$ adapted to bear against the end of the sleeve $c$.

Secured to or made integral with the bracket $b$ and sleeve $c$ and projecting upwardly therefrom is a toothed segment $i^2$, with which the locking bar of a lever $i'$ is adapted to engage, a portion of the teeth of said segment being made square and a portion being made in the form of ratchet teeth. The lever $i'$ is pivotally connected to the toothed segment $i^2$ and carries a segmental gear $j$ which is adapted to mesh with a similar segmental gear $j'$ carried by the end of the crank axle $D'$. A foot lever $k$ is secured to the end of the crank axle $D'$. From this construction and arrangement of parts it will be seen that by pulling the lever $i'$ or pushing against the foot lever $k$, the crank axle $D'$ will be made to turn and the plow will be raised. It will also be seen that the plowman can operate the hand lever $i'$ and the foot lever $k$ simultaneously thereby rendering the raising of the plow very easy and with little exertion on the part of the plowman. The reverse movement of said levers $i'$ and $k$ will cause the plow to be lowered. It will further be seen that the sleeve $c$ affords the proper inclination of the forward furrow wheel $E'$. A lever $l$ is secured to the end of the crank axle $D$ in proximity to the beam $A$ and carries a locking bar $l'$, adapted to engage a toothed segment $l^2$ preferably secured to the standard $B$. By operating the lever $l$ the depth which it is desired to plow is regulated. By arranging the small furrow wheel $E^2$ as above explained side draft will be prevented and the plow will be permitted to turn square corners without raising the same, and at the same time to have the turn of the corners perfect and the plowing at such points equal to the regular furrows. The object of placing the land wheel $E$ so far back and having the crank axle $D$ of the same working in bearings projecting from the standard $B$, is that a pivot is formed by the small furrow wheel $E^2$, and the land wheel $E$ acts as a guide to same and makes the turn perfect.

Mounted loosely on the crank axle $D$ in proximity to the bearing of said axle, is a brake $m$, comprising a foot lever $m'$ and a brake or rubbing arm $m^2$, said arm being adapted, when the lever is pressed by the foot of the plowman, to engage the periphery of the small furrow wheel $E^2$ and thus retard the movement of the plow when plowing on a hill. An ear $n$ projects from the brake $m$, and between this ear and the under face of the bracket $g$ a spring $o$ is inserted, whereby to retain the brake arm $m^2$ normally away from out of contact with the furrow wheel $E^2$. No tongue is used on this plow and therefore the brake above described is a very desirable feature.

A clevis $p$ is provided at the forward end of the beam $A$, to which the horses are attached.

Various slight changes might be made in the details of construction of my invention without departing from the spirit thereof or limiting its scope and hence I do not wish to limit myself to the precise details of construction herein set forth, but, Having fully described my invention, what I claim as new, and desire to secure by Letters Patent, is—

1. In a wheeled plow, the combination with a beam, a standard and a plow carried by the standard, of a bracket a sleeve or bearing projecting laterally from said bracket and integral therewith, a crank axle mounted in said sleeve or bearing, a land wheel carried by said crank axle a small furrow wheel and a sleeve projecting through the standard and forming a bearing for the axle of the wheel, substantially as set forth.

2. In a wheeled plow, the combination with a beam, a standard and a plow carried by the standard, of a sleeve or bearing projecting laterally from said standard, a crank axle extending loosely through said sleeve or bearing, a land wheel carried by said crank axle, a lever secured to said crank axle and carrying a locking bar, and a toothed segment with which said locking bar is adapted to engage, substantially as set forth.

3. The combination with a plow beam, of a standard having an integral laterally projecting sleeve adapted to receive and form a bearing for an axle, said standard provided with a hole at its rear end, and a plate having a sleeve thereon adapted to project through the hole and receive the axle of a wheel and the plate to be secured to the standard, substantially as set forth.

4. The combination with a plow beam, of a plow standard having rearwardly and downwardly projecting portion or flange, said portion having a hole therein, a sleeve projecting through said hole, said sleeve secured to the standard, a furrow wheel supported by said sleeve a mold board, and a brace extending from the mold-board to the standard, substantially as set forth.

5. In a wheeled plow, the combination with a beam, standard and plow carried by said standard, of a furrow wheel, and a scraper adjustably secured to said beam, said scraper having a shoulder adapted to scrape the periphery of said furrow wheel and an arm projecting over one face of said furrow wheel to a point near its axle and adapted to scrape said face, substantially as set forth.

6. The combination with a plow beam, and standard, of a furrow wheel, and a scraper adjustably secured to the rear end of the beam, said scraper secured to one side of the beam and provided with a flange which laps around the rear end of the beam to prevent its swinging, substantially as set forth.

7. The combination with a beam, a toothed segment secured thereto, and a sleeve projecting laterally from the beam, of an axle capable of being turned in the sleeve, its outer end supported in a wheel, a toothed wheel secured to the axle, and a hand lever having a latch thereon adapted to operate in connection with the toothed segment, and a segmental gear carried by the lever, the teeth of which are adapted to engage the teeth of the wheel on the axle, substantially as set forth.

8. In a wheeled plow, the combination with a beam, standard and plow carried by said standard, of a land wheel, an inclined sleeve carried by the beam, a crank axle passing through said inclined sleeve, a furrow wheel mounted on said crank axle, a segmental gear carried by said crank axle, a pivoted lever, a segmental gear carried by said lever and adapted to mesh with the first-mentioned segmental gear, a toothed segment, and a locking bar carried by said lever and adapted to engage said toothed segment, substantially as set forth.

9. In a wheeled plow, the combination with a beam, standard and plow carried by said standard, of a land wheel, an inclined sleeve carried by the beam, a crank axle passing through said inclined sleeve, a furrow wheel mounted on said crank axle, a segmental gear carried by the crank axle, a foot lever also carried by said crank axle, a pivoted lever and a segmental gear carried by said pivoted lever and adapted to mesh with the first-mentioned segmental gear, substantially as set forth.

10. The combination with a plow standard, a furrow wheel, and axle, of a brake mounted on the axle and capable of swinging thereon, and a spring for actuating said brake in one direction, substantially as set forth.

11. In a wheeled plow the combination with a beam, of a seat supporting bracket projecting laterally from the beam, said bracket having a tool receptacle and a wrench supporting arm thereon, substantially as set forth.

12. The combination with a beam, and axle, of a seat supporting bracket projecting laterally from the beam in proximity to the axle, a furrow wheel, a brake lever loosely mounted on the axle, and a spring bearing on the brake lever, and seat supporting bracket for normally throwing the brake out of contact with the furrow wheel, substantially as set forth.

13. The combination with a plow beam, an axle, and means for rocking the axle, of a furrow wheel, and a brake loosely mounted on the axle in position to bear upon the furrow wheel, substantially as set forth.

14. The combination with a beam, a plow standard secured to the beam, and a furrow wheel supported to turn in the standard or relative thereto, of an axle, and a brake lever loosely mounted on the axle, one end of the lever projecting between the plow standard and periphery of the furrow wheel and adapted to bear upon the latter, substantially as set forth.

In testimony whereof I have signed this specification in the presence of two subscribing witnesses.

CHARLES ANDERSON.

Witnesses:
F. C. NIPPOLD,
MICHAEL M. MATTHEWS.